R. J. SMITH.
SEAT LOCK FOR WAGONS.
APPLICATION FILED JAN. 17, 1914.
1,124,542.
Patented Jan. 12, 1915.
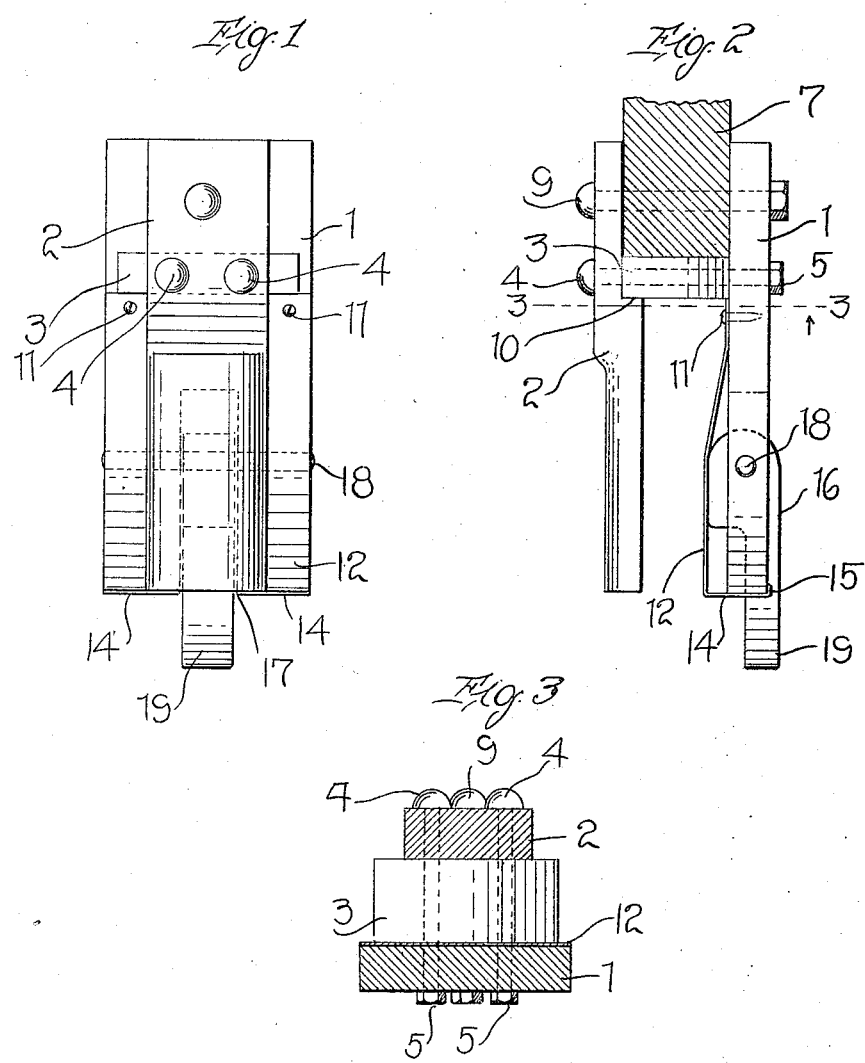
Inventor
ROBERT J. SMITH
Witnesses
By Watson E. Coleman
Attorney

UNITED STATES PATENT OFFICE.

ROBERT J. SMITH, OF CANON CITY, COLORADO.

SEAT-LOCK FOR WAGONS.

1,124,542.	Specification of Letters Patent.	Patented Jan. 12, 1915.

Application filed January 17, 1914. Serial No. 812,753.

*To all whom it may concern:*

Be it known that I, ROBERT J. SMITH, a citizen of the United States, residing at Canon City, in the county of Fremont and State of Colorado, have invented certain new and useful Improvements in Seat-Locks for Wagons, of which the following is a specification, reference being had to the accompanying drawings.

This invention relates to certain improvements in seat locks for wagons and has relation more particularly to a device of this general character especially designed and adapted for use in connection with spring seats; and the object of the invention is to provide a device of this character having means of a novel and improved character whereby a seat may be detachably secured to the side boards of a box of a vehicle, whereby such seat may be applied in or removed from operative position with convenience and facility.

The invention consists in the details of construction and in the combination and arrangement of the several parts of my improved seat lock for wagons, whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in elevation of a lock constructed in accordance with an embodiment of my invention; Fig. 2 is a view in side elevation of the device as shown in Fig. 1, the coacting part of the seat structure being shown in fragment and in section; and Fig. 3 is a sectional view taken on the line 3—3 of Fig. 2.

As disclosed in the accompanying drawings, 1 and 2 denote plates of suitable configuration and formed of any desired material but preferably of metal and maintained in fixed spaced relation through the medium of the interposed plate 3 positioned intermediate the length of the plates 1 and 2 but in close proximity to the upper ends thereof. While the plates 1, 2 and 3 may be cast integrally if so desired, I prefer that they be of separate parts and be united one to the other through the medium of the bolts 4—4 directed therethrough, as illustrated in the drawings, the opposite extremities of such bolts being upset, as at 5, whereby a rigid structure is assured. The upper extremities of the plates 1 and 2 and the interposed plate 3 serve to afford a pocket, in which is adapted to be positioned a supporting bar 7 of a spring seat, 8, such bar being maintained against displacement through the medium of a bolt 9, directed through the upper extremities of such plates 1 and 2 and the bar 7, as is clearly shown in the accompanying drawings. I also find it of advantage to have the inner plate 2 so formed as to afford the inwardly disposed shoulder 10 on which the inner marginal portion of the horizontally disposed plate 3 is adapted to rest in order that the strength of the device may be greatly increased.

Suitably secured, as at 11, to the inner face of the outer plate 1 and in close proximity to the interposed plate 3 is the flat spring member 12 produced preferably of sheet steel which is disposed over substantially the entire lower area of the plate 1 and is provided at its lower end with the inwardly directed spaced extensions 14 terminating in the upwardly directed flanges or lips 15, whereby the inward movement of the spring member or plate 12 is limited or controlled especially when the seat is removed from the wagon box as otherwise the springs 12 would have a tendency to intersect the space between the plates 1 and 2 and would thus be liable to breakage upon the application of the seat upon the box or to materially interfere with said application.

The spring member or plate 12 is adapted to serve as a clamping element whereby the device may be effectively clamped or locked to the box of the vehicle and, as herein disclosed, the requisite tension is imposed upon the member or plate 1 through the medium of the cam member 16 positioned within the longitudinally directed recess 17, produced in the lower edge of the outer plate 1 and pivotally maintained in position by the pin 18 mounted in the adjacent portions of such plate 1. As herein disclosed, the shank 19 of the cam is of such a length as to extend below the lower end of the plate 1 when in operative position whereby the same may be readily and conveniently grasped when it should be desired to release the clamp to remove the seat from operative position.

While I have described herein and illustrated in the accompanying drawings but one seat lock, it is to be observed that in practice it is my intention to employ two of such locks in connection with each of the supporting bars 7, which bars are of a form conventionally used in spring seats.

In view of the foregoing, it is though to be obvious that a seat lock constructed in accordance with my invention is of an extremely simple and comparatively inexpensive nature and is particularly well adapted for use by reason of the convenience and facility with which a seat may be detachably applied to the box of a vehicle and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent, is:

A device of the character described comprising two spaced plates adapted to straddle the side of a vehicle box, a plate interposed between the first mentioned plates intermediate their lengths and around a pocket to receive an element of a seat, a spring clamping plate secured to the inner face of one of said plates in close proximity to the intermediate plate, the lower end of said spring member being provided with an angular extension adapted to bridge the lower extremity of the plate to which it is connected and provided with an upstanding lip coacting with the outer face of said plate to limit the inward movement of the spring plate, and a cam element carried by said plate adapted to coact with the spring member for forcing the same into clamping position, said cam being provided with an elongated straight face adapted to engage the spring plate when the cam is in its operative adjustment.

In testimony whereof I hereunto affix my signature in the presence of two witnesses.

ROBERT J. SMITH.

Witnesses:
W. H. WELCH,
F. L. SMITH.

Copies of this patent may be obtained for five cents each, by addressing the "Commissioner of Patents, Washington, D. C."